Figure 1:
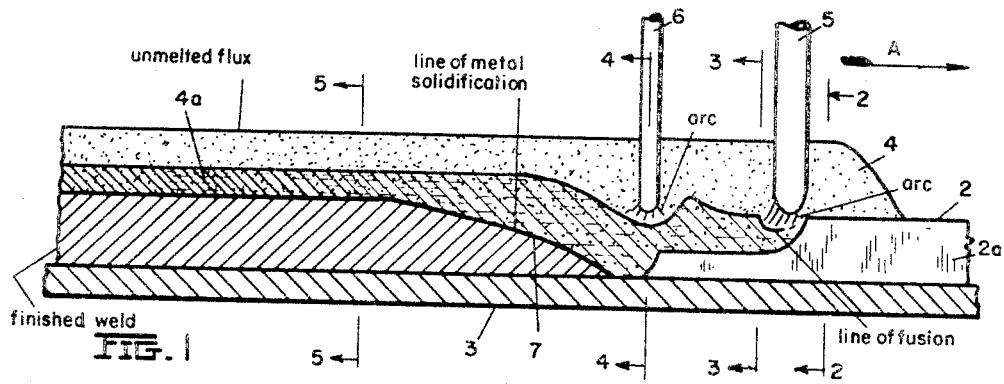
Figure 2:
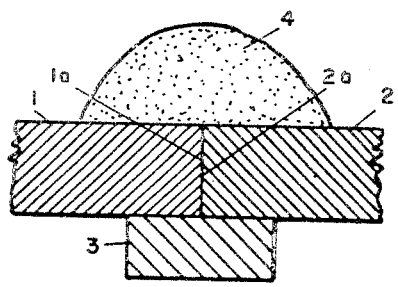

June 1, 1943.   G. G. LANDIS ET AL   2,320,824
ELECTRIC WELDING
Filed June 27, 1941   2 Sheets-Sheet 2

INVENTORS
GEORGE G. LANDIS and
L. KEEVER STRINGHAM
BY Oberlin, Limbach + Day
ATTORNEYS Patented June 1, 1943

2,320,824

UNITED STATES PATENT OFFICE 2,320,824

ELECTRIC WELDING

George G. Landis and L. Keever Stringham, University Heights, Ohio, assignors to The Lincoln Electric Company, Cleveland, Ohio, a corporation of Ohio Application June 27, 1941, Serial No. 399,984

11 Claims. (Cl. 219—10)

The present invention, relating as indicated to arc welding, has more particular regard to a process of arc welding characterized by the employment of a plurality of arcs operating in sequence on the work. Still more particularly such invention has to do with a process of forming continuous seams by arc welding as in welding together the edges of metal plates or of a sheet or plate bent into cylindrical form as in the manufacture of pipe, tanks and the like. The important results accomplished by the invention are, first of all, a very considerable speeding up of the welding operation, the elimination of the necessity for scarfing the edges of the parts to be welded together, and the elimination of the difficulty in obtaining a satisfactory weld where either moisture or mill scale (iron oxide) are encountered.

Heretofore in the formation of such seams by arc welding, especially where the plates are relatively thick, it has been considered necessary to chamfer or otherwise shape the juxtaposed edges so as to form a V-groove in which weld metal produced by the electric arc may be deposited simultaneously with the interfusion of such juxtaposed edges. Furthermore, it has often been found necessary to grind or otherwise clean the edges so that they are free of moisture or scale before satisfactory welds could be made. Likewise, it has often been found necessary where welding relatively thick plates to make a number of passes along such seam in order to fill up the seam with such weld metal and properly interfuse same with the parent metal of the plates that are being welded together.

Such multiple pass welding, in which successive deposits of weld metal are superposed, presents a number of obvious objections in addition to the time and additional current required in the operation. Thus, it is essential to the securing of a sound weld that each successive layer of deposited weld metal be interfused not only with the adjacent edges of the plates being welded, but also with the previously deposited layer. Furthermore, such weld metal requires to be deposited under a coating of protective flux which remains as a hard glossy coating, and this has to be removed between each successive pass. Care is therefore required to insure that no occlusions of such flux remain in the seam as it is built up and other impurities are apt to remain in the deposited weld metal. Finally, due to the fact that the edges of the plates being welded cool off more or less between successive passes, strains are induced in the seam and the plates themselves adjacent the seam tend to become distorted.

One principal object of our present invention is to provide a process in which the welding operation may be performed even in the case of relatively thick plates with a single pass of the electric arc, or rather plural arcs, which characterize the process. At the most, two passes will suffice by traversing such plural arcs along the seam, first on one side and then the other. The welding operation may furthermore be performed at a much greater speed than heretofore, and while this in itself is a valuable objective, such increase in speed is coupled with an improved treatment under the arc of the interfused weld metal and parent metal, which insures the production of an unusually sound weld free from occlusions of flux and other impurities.

Furthermore, it is possible with our improved process to use ordinary bare weldrod for the production of weld metal, and the edges of the plates to be joined do not generally require to be chamfered, ground, buffed, preheated or otherwise prepared for the welding operation.

In conventional arc welding an arc is maintained between the metal to be welded and a suitable electrode. This may be a carbon rod, in which case the additional weld metal is supplied by a metal rod or wire fed to the arc, or it may be a metal weldrod which is itself melted down and deposited in the seam. Two imperfections which limit the travel speed are porosity and failure of the weld metal and parent metal to coalesce properly. In order, therefore, to achieve satisfactory results in rapid welding it is necessary to overcome both of these difficulties, namely, imperfect coalescence of the deposited weld metal with the parent metal and porosity which is equally objectionable.

These ends we accomplish by the use, as previously indicated, of two arcs in relatively close sequence, each of which performs a different function in the production of the ultimate deposited weld metal which is relied upon to join the work parts. Either or both of such arcs may be a so-called carbon arc or a so-called metallic arc and, if desired, the successive operations may be performed by one or more than one such arcs. Generally, it is preferable, although not necessary, to carry out the first operation with a carbon arc and the second with a metallic arc which supplies the weld metal. However, both operations may be carried out with carbon arcs, introducing the weld metal in the second operation separately in the usual way, and other variations, which will be hereinafter pointed out, may be made in the arrangement of the arcs.

To the accomplishment of the foregoing and related ends, said invention then consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

Figure 6:
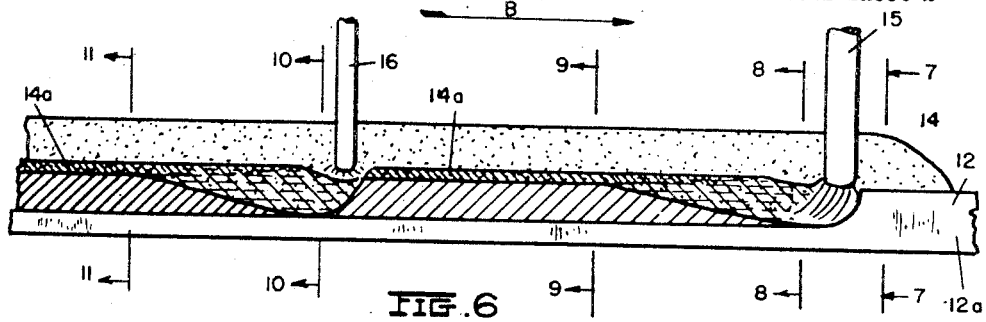
Figure 7:
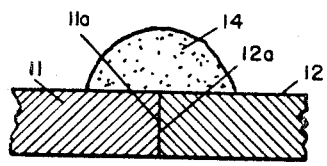
Figure 8:
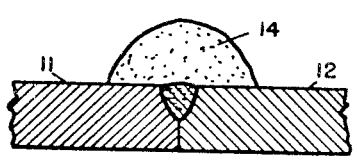
Figure 9:
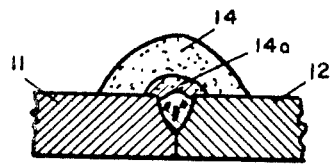
Figure 10:
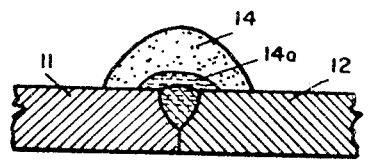
Figure 11:
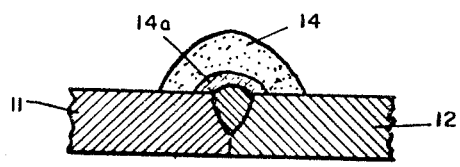
Figure 12:

In said annexed drawings:

Fig. 1 illustrates in more or less diagrammatic form the utilization of our plural arc process in welding together the juxtaposed edges of two plates where a backing strip is employed, the view being a longitudinal section centrally of the seam;

Figs. 2, 3, 4 and 5 are similar transverse sectional views of such seam taken on successive transverse planes as indicated by the lines 2—2, 3—3, 4—4 and 5—5 of Fig. 1;

Fig. 6 is a view similar to that of Fig. 1, but illustrating a modification in the operation in which instead of employing a backing strip beneath the seam that is being welded and completely interfusing the juxtaposed edges of the plates which are to be joined, such edges are thus interfused to a lesser depth, and in order to complete the weld the operation is duplicated on the other side of the seam;

Figs. 7, 8, 9, 10 and 11 are similar transverse sectional views of such seam taken on successive transverse planes as indicated by the lines 7—7, 8—8, 9—9, 10—10 and 11—11 of Fig. 6; and Fig. 12 is a section showing the completed weld where the welding is effected in two passes from opposite sides.

It will be understood that the illustration of the process afforded by the foregoing figures of the drawings is necessarily more or less schematic and that in particular the extent of penetration of the parent metal under the action of the successive arcs and the disposition of the molten metal resulting from the operation of said arcs, respectively, at a point intermediately between the arcs, cannot be directly observed and may furthermore vary considerably under different operating conditions. However, the characteristics of the finished weld or seam to which reference will hereinafter be made may, of course, be quite exactly determined.

Referring to the operation of our process, as illustrated in Figs. 1 to 5, inclusive, the two plates 1 and 2 of which the edges are to be welded together, are suitably supported by means (not shown) with such edges disposed approximately centrally on the usual weld strip 3. The juxtaposed edges 1a and 2a of the plates 1 and 2 require no special preparation, and in particular no scarfing or beveling thereof is necessary, and while shown in the transverse sectional views, Figs. 2 and 3 of the drawings, as closely abutting, it will usually be found that greater penetration with less power consumption can be secured if such edges are spaced slightly apart. Such spacing between edges will generally vary in accordance with the thickness of the metal, e. g., in the neighborhood of 10% of such thickness. However, there are conditions, of course, where it will be found desirable to maintain the edges in actual abutting contact, particularly when working with relatively thin plates or sheets.

Disposed along the line of the seam on the side of the plates 1 and 2, to which the welding arcs are to be applied, is a layer 4 of flux or slag in finely divided form, such layer being of sufficient thickness so that the molten metal resulting from the operation of the arcs will be at all times covered thereby, and even after such layer or the underlying portion thereof has been rendered molten by the heat of the arcs. The composition of such flux or slag may be various, depending upon conditions, numerous formulas for its composition being available both as coatings for metallic weldrod and for use in so-called submerged arc welding, i. e., where the flux is disposed in the form of a layer along the line of the seam. As an example of one well known flux composition suitable for deep flux welding, such as is involved in the practice of our present process, we should mention finely divided open-hearth or other steel furnace slag, to which is added a fluoride, e. g., fluorspar, if the melting point of the slag is higher than desired.

As illustrated in Fig. 1, two electrodes 5 and 6 are employed in carrying out the welding operation, these being moved in sequence along the seam in the direction indicated by the arrow A, the first such electrode 5 being a carbon rod or pencil such as ordinarily used in carbon arc welding, and the second electrode 6 being a bare metallic weldrod. Such electrodes will be supported in a head of usual construction, which includes means for automatically feeding them downwardly to the work as they are consumed, and in the case of such metallic weldrod, if the diameter will permit, it may be thus fed from a reel in familiar fashion. Both electrodes may be connected to the same source of potential, such as a welding generator, and when thus connected will preferably be in series and of opposite polarity.

One distinct advantage of having the arcs in series and of opposite polarity is the elimination or material reduction of the variable ground effect which normally affects arc blow as the arc travels along the seam. Providing the two electrode currents are equal and of opposite polarity, it is possible to have zero ground current. If the polarities are opposite but the currents are not equal, the current may be the difference between the two electrode currents. This in general will be low as compared with the ground current of single arc welding. However, greater flexibility of control is possible when each electrode is connected to an independent source of electrical supply, the reasons for and advantages of such independent control being pointed out in detail later.

In addition to the control of the blow of the arcs between the respective electrodes and the work by varying in the manner above described, the magnetic flux produced by the current in such arcs, electromagnetic means may be employed in association with one or both electrodes. Several forms of such means suitable for such use will be found described in Patents Nos. 1,840,600 to C. C. Peck et al., dated January 12, 1932, and 2,206,037 to G. G. Landis et al., dated July 2, 1940.

Ordinarily, the factor for thus controlling the blow of the respective arc should be such that both arcs are blown rearwardly, i. e., in a direction opposite to that in which the electrodes travel in relation to the work.

As previously stated, in place of a single carbon electrode 5, and a single metallic electrode 6, two or more of each, forming a group, may be utilized in the same sequential arrangement as illustrated in the case of such single electrodes illustrated in Fig. 1.

In operation, the lower ends of both electrodes will be submerged in the layer 4 of flux, and after arcs have been established such ends will be maintained at the proper distance from the metal, such metal in the case of the carbon arc being the unfused parent metal of the plate edges, and in the case of the metal electrode being the fused body of metal resulting from the sequential action of the carbon and metallic arcs.

Figure 3:
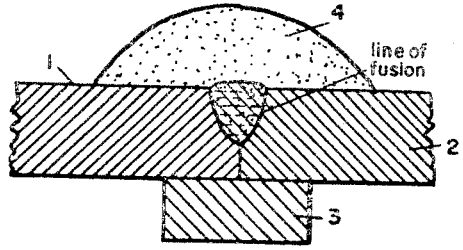
Figure 4:
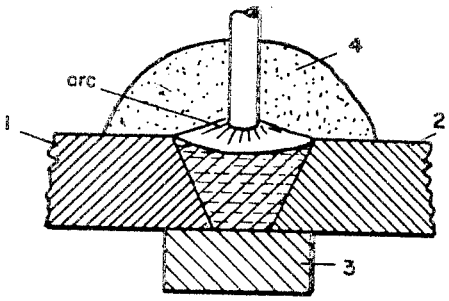
Figure 5:
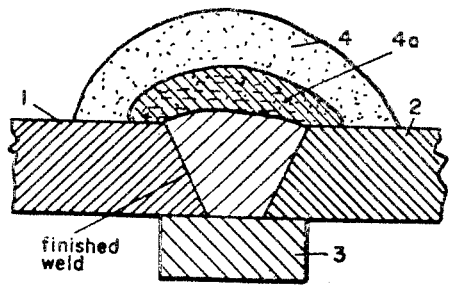

As the electrodes travel in the direction of the arrow A, the forward electrode will be adjusted so that the carbon arc therefrom will melt down the juxtaposed edges of the plates along the seam to a substantial depth, but not entirely through to the backing up strip, as shown in Fig. 3. The metallic arc produced by the following electrode 6 will serve to maintain the metal from such forward carbon arc in molten condition, complete the fusion of the plate edges to full depth, and add additional weld metal which is interfused with the molten parent metal so as to substantially entirely fill the seam, as illustrated in Fig. 1. Preferably the molten metal thus produced will be sufficient to rise slightly above the upper surface of the plates 1 and 2 so that when solidified the seam will have the cross-sectional form illustrated in Fig. 5.

In addition to fusing the juxtaposed edges of the plates the carbon arc serves to fuse the underlying portion of the flux layer 4, to drive off moisture and gases from the flux and plate and to reduce oxide on the edges or to have it go into the slag.

The metallic arc may or may not melt more parent metal or more flux. The metallic arc does produce additional weld as just described. While the composition of flux layer is such that its specific gravity will be of lighter than that of the molten metal so that its will tend to rise to the surface of the latter, the turbulent condition of such metal, particularly under the carbon arc, is such as to entrain particles of flux, as illustrated in Figs. 1 and 6. However, under the action of the succeeding metallic arc, the molten metal becomes highly fluid and these particles of flux, as well as other impurities, collect in the molten body of flux which overlies the interfused metal. As a result, upon solidification of the latter, there is a clear line of demarcation between the interfused metal and the molten flux, so that the solidified metal not only coalesces perfectly with the parent metal of the plates, but is practically free from all objectionable occlusions, either solid or gaseous.

As previously indicated, Figs. 6 to 11, inclusive, illustrate a modification in our process in which a plurality of arcs is passed successively first along one side of the seam and then along the other, no backing-up strip being employed. The plates, of course, should be reversed between the two passes so that the welding operation may be performed from above. It will, of course, be understood that in both illustrated modifications of our process, the successive arcs may be caused to traverse the seam by moving either the electrodes relatively to the work or the work relatively to the electrodes.

In two-pass welding, as illustrated in Figs. 6 to 11, inclusive, the plates 11 and 12 are disposed just as plates 1 and 2 in the previously described arrangement, except that as already stated no backing-up strip is utilized. Likewise, a layer 14 of powdered flux or slag is disposed along the seam just as before, and two electrodes, one a carbon pencil 15 and the other a metallic weldrod 16, are caused to move along the line of the weld in the direction indicated by the arrow B. As illustrated electrodes 15 and 16 are located somewhat further apart than electrodes 5 and 6 in Fig. 1, and it will be understood that such variation in distance is permissible in either modification of our process. The effect in increase in the distance between the electrodes as in Fig. 6 will be to permit solidification or partial solidification of the fused metal which results from the operation of the advance carbon electrode 15, but such metal will still be highly heated as it comes under the arc of the succeeding metallic electrode 16. The adjustment of the two electrodes furthermore is such that the juxtaposed edges of the plates to be welded are not fused down for their entire vertical extent, with the result that the edges are left unwelded in their lower extent. When, however, upon the second pass of the electrodes along the opposite side of the seam the parent metal is fused down and weld metal added, the interfusion of the seam edges and such previously deposited and solidified metal is completed, as illustrated in Fig. 12.

We are aware that it has been heretofore proposed preliminarily to heat metal parts or the edges thereof which are to be welded together as by passing such parts through a furnace or the like; this on the assumption that a saving in the amount of electric current consumed in the welding operation may thus be effected. Also, as has already been noted herein, one customary method heretofore employed in welding deep seams has been to deposit weld metal in successive layers, and thus build up a seam of requisite thickness. As will be obvious, our method or process is distinguished from the foregoing in that the juxtaposed edges of the parts are melted down by the first, carbon arc, so as preliminarily to join such parts, and the metal of the resultant juncture is then subjected to further fusion under the action of the second, metallic arc, and at the same time further weld metal is added to such juncture. As a result of subjecting the metal thus preliminarily melted down by the first arc to the action of the second arc, such metal is refined, freed of any occluded flux and other impurities, and thoroughly coalesced with the adjacent parent metal. Observation of the plural arcs operating in accordance with our invention shows that the molten metal is blown backwardly into the seam by the carbon arc, where it collects as a pool and where the metallic arc closely follows such pool while such pool is still liquid when operated upon by the latter.

Even where the electrodes are spaced so that a sufficient interval occurs between the arcs to permit more or less complete solidification of the metal thus acted upon by the carbon arc, such metal is still at a high temperature so as to be immediately rendered molten again by the second arc and interfused with the weld metal added at this point.

The distance the second arc may be spaced from the first will depend upon the thickness of the plates to be welded and the degree of penetration or depth of the weld to be formed; that is, if penetration the full depth is desired. With formation of the complete seam or juncture, the arcs will be relatively closely spaced as in Fig. 1, whereas in two-pass welding where a juncture is effected first on one side and then completed on the other, the arcs may be spaced further apart, as illustrated in Fig. 6.

While, as stated above, the two arcs may be connected in series, there is an advantage incidental to their independent energization, in that this permits the degree of penetration of the forward, carbon arc, to be varied independently of the amount of filler metal deposited by the metallic arc. It will also be understood that instead of using a carbon arc in advance, followed by a metallic arc, two carbon arcs may be utilized and the necessary filler metal in connection with the latter supplied to the seam by introducing an independent metal rod or wire into such carbon arc so that it will be melted off at the desired rate. Likewise two metallic arcs may be employed in sequence, it being noted that in such case, since additional molten metal will be introduced into the seam at the first arc, it may be desirable in order to secure satisfactory penetration and accommodate such additional metal, to separate the edges of the plates to a greater extent or to scarf such edges or employ both these expedients. With such alternative arrangements, e. g., of two carbon arcs or two metallic arcs, the important advantages of our process may still be obtained, although in general we deem it preferable to employ a carbon arc in advance with the metallic arc following, this arrangement in general being the more convenient.

In the use of plural arcs which operate sequentially on the seam as hereinbefore described, the important function performed by the second arc is the refining of the metal which enters into the finished juncture or weld. At the same time, additional weld metal is most conveniently added to the juncture at this point, and while the first arc will ordinarily be utilized to melt down the major portion of the parent metal that enters into the juncture or weld, the second arc may also further melt down the juxtaposed edges of the plates. The amount of parent metal melted down by the second will depend in a measure on the energy and consequent degree of penetration of such second arc. In single-pass welding, as illustrated in Figs. 1 to 5, inc., the degree of penetration of the second arc will generally be greater than that necessary in two-pass welding, as illustrated in Figs. 6 to 12, inclusive, i. e., when the work is welded from opposite sides, and accordingly the amount of parent metal melted down by the second arc in the one-pass operation is greater than would generally be the case in two-pass work.

One important advantage of our improved dual arc process of welding is that a sound weld can be produced with a smaller addition of weld metal than by previously known processes. In other words, the finished juncture or weld will contain a predominantly large proportion of parent metal derived from the fusion of the juxtaposed edges of the parts being welded. Another important and related advantage is the increased speed of operation, this being due to the fact that in our present improved process the melting down and refining of the melt instead of being performed at a single station along the seam, is performed at successive stations, and accordingly the concentration of energy (taking into account the speed of travel) at any one point along the seam, is considerably lower than any prior art process. Still another advantage in our process is that no intervening operation is required between the two arcs; in other words, the action of the second follows immediately without removal of the slag or molten flux produced by the action of the first arc. Preferably the arrangement of the successive arcs is such that the flux will not completely solidify between the first arc and the second, just as preferably the fused metal produced by the first arc will be acted upon by the second while it is still molten, or at least has not completely solidified.

We specially emphasize as advantages of our process the greatly increased speed of operation which it makes possible, not merely in the actual welding operation, but by rendering entirely unnecessary and preliminary scarfing of the edges to be welded, as well as the precautions which have heretofore been required to eliminate moisture and mill-scale of the weld area.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. A method of welding metal parts together, which comprises melting down juxtaposed edges thereof under a deep layer of flux, whereby such parts are preliminarily joined and a portion of such flux layer rendered molten, and then subjecting the metal of the resultant juncture to further fusion without removal of such previously melted flux.

2. A method of welding metal parts together, which comprises melting down juxtaposed edges thereof under a deep layer of flux, whereby such parts are preliminarily joined and a portion of such flux layer rendered molten, then subjecting the metal of the resultant juncture to further fusion without removal of such previously melted flux, and simultaneously with such last step adding further weld metal to the juncture.

3. A method of welding metal parts together, which comprises the steps of preliminarily melting down the juxtaposed edges thereof by means of a carbon electric arc operating through a deep lawer of flux, whereby a portion of such flux layer is rendered molten, and then subjecting the resultant juncture, while still relatively highly heated, to the action of a metallic arc without the removal of such previously melted flux.

4. A method of welding metal parts together, which comprises the steps of preliminarily melting down the juxtaposed edges thereof by means of a carbon electric arc operating through a deep layer of flux, whereby a portion of such flux layer is rendered molten, and then subjecting the resultant juncture, while still substantially molten, to the action of a metallic arc without the removal of such previously melted flux.

5. A method of welding by the electric arc, the steps which comprise traversing the seam to be welded with two arcs in sequence, and controlling the direction of blow of said arcs by adjusting the spacing thereof relative to each other.

6. In a method of welding by the electric arc, the steps which comprise traversing the seam to be welded with two arcs in sequence, and controlling the direction of blow of said arcs by adjusting the direction of flow of the current in the respective arcs.

7. In a method of welding by the electric arc, the steps which comprise traversing the seam to be welded with two arcs in sequence, controlling the direction of blow of said arcs by adjusting the direction of flow of the current in the respective arcs and by adjusting the spacing thereof relative to each other.

8. In a method of welding by the electric arc, the steps which comprise traversing the seam to be welded with two arcs in sequence, and controlling the direction of blow of said arcs by arranging the flow of the current in the respective arcs in sequence, such arcs being of like polarity.

9. In a method of welding by the electric arc, the steps which comprise traversing the seam to be welded with two arcs in sequence, and controlling the direction of blow of said arcs by arranging the flow of the current in the respective arcs in sequence, such arcs being of opposite polarity.

10. A method of welding metal parts together, which comprises the steps of preliminarily melting down the juxtaposed edges thereof under cover of a deep layer of a finely divided flux, and then refining the metal of the resultant juncture by further fusion thereof without the removal of such flux.

11. A method of welding metal parts together, which comprises the steps of melting down juxtaposed edges thereof by means of a carbon electric arc operating under a deep layer of flux so as preliminarily to join such parts, a portion of such flux layer being rendered molten by such arc, and then, without removal of such flux, subjecting the resultant juncture, prior to complete solidification thereof, to the action of a metallic arc operative both to further fuse the metal of such juncture and to add additional metal thereto.

GEORGE G. LANDIS.
L. KEEVER STRINGHAM.